July 7, 1959
J. A. CHESEBROUGH ET AL
2,894,178
PHOTOELECTRIC SYSTEM
Filed Jan. 18, 1956
3 Sheets-Sheet 1
FIG_1_
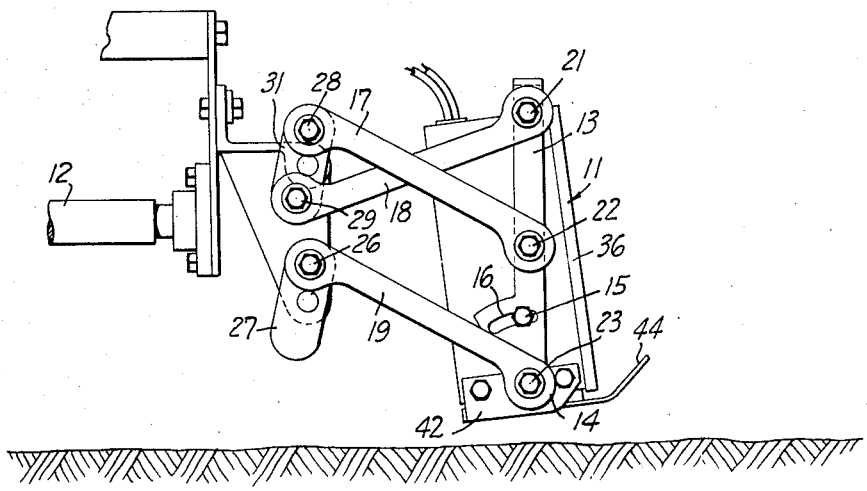
FIG_4_
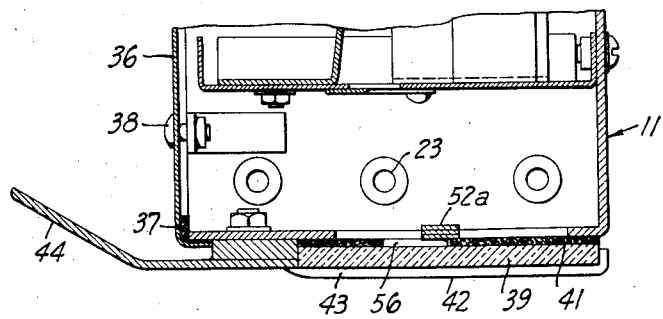
INVENTORS
JAMES A. CHESEBROUGH
DAVID R. SCOTT
HAROLD F. ELLIOTT
BY
ATTORNEYS July 7, 1959   J. A. CHESEBROUGH ET AL   2,894,178
PHOTOELECTRIC SYSTEM
Filed Jan. 18, 1956   3 Sheets-Sheet 2
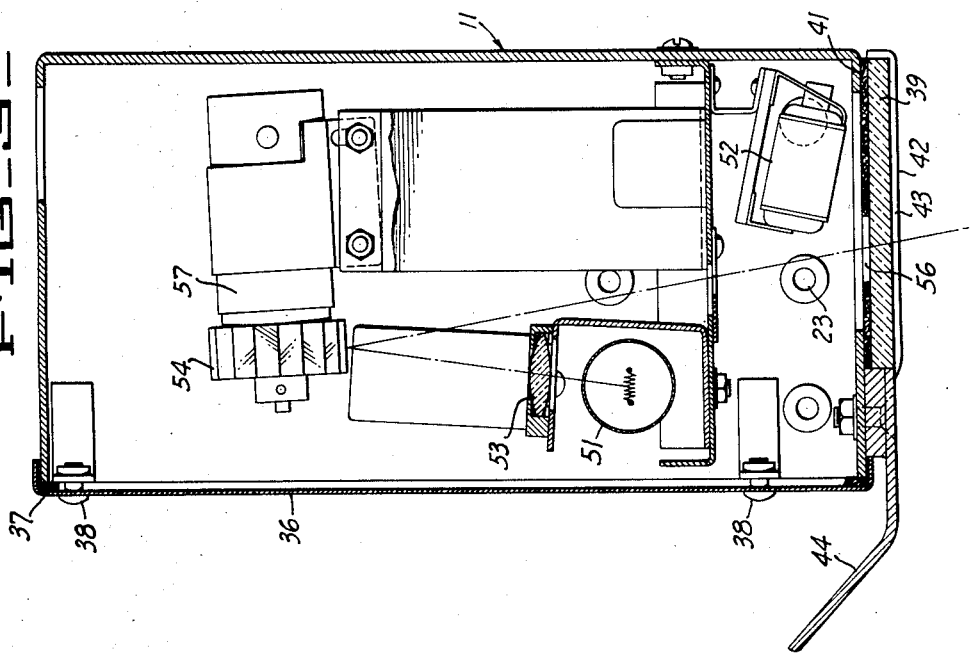
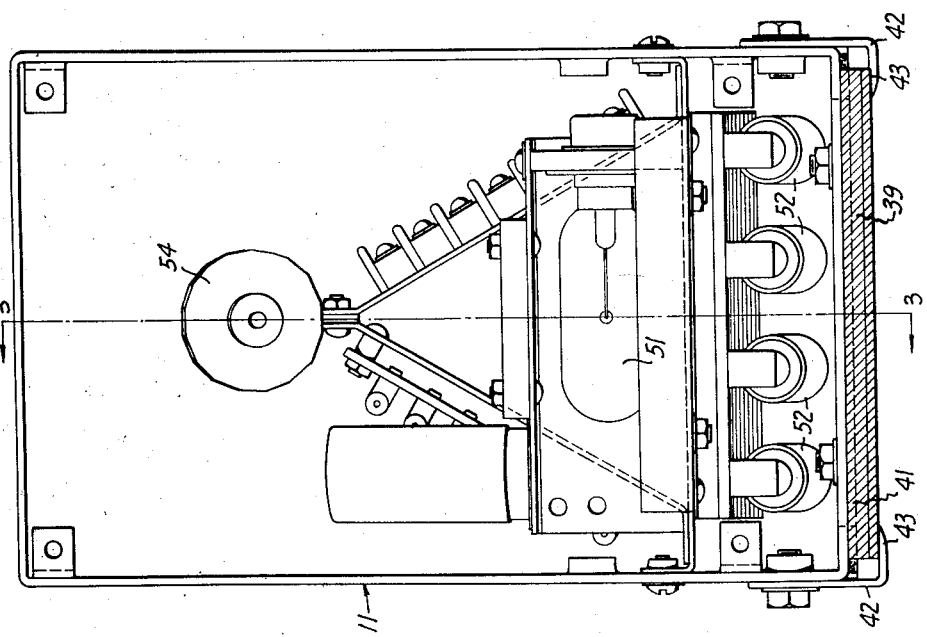
INVENTORS
JAMES A. CHESEBROUGH
DAVID R. SCOTT
HAROLD F. ELLIOTT
BY
*Fletcher & Swain*
ATTORNEYS

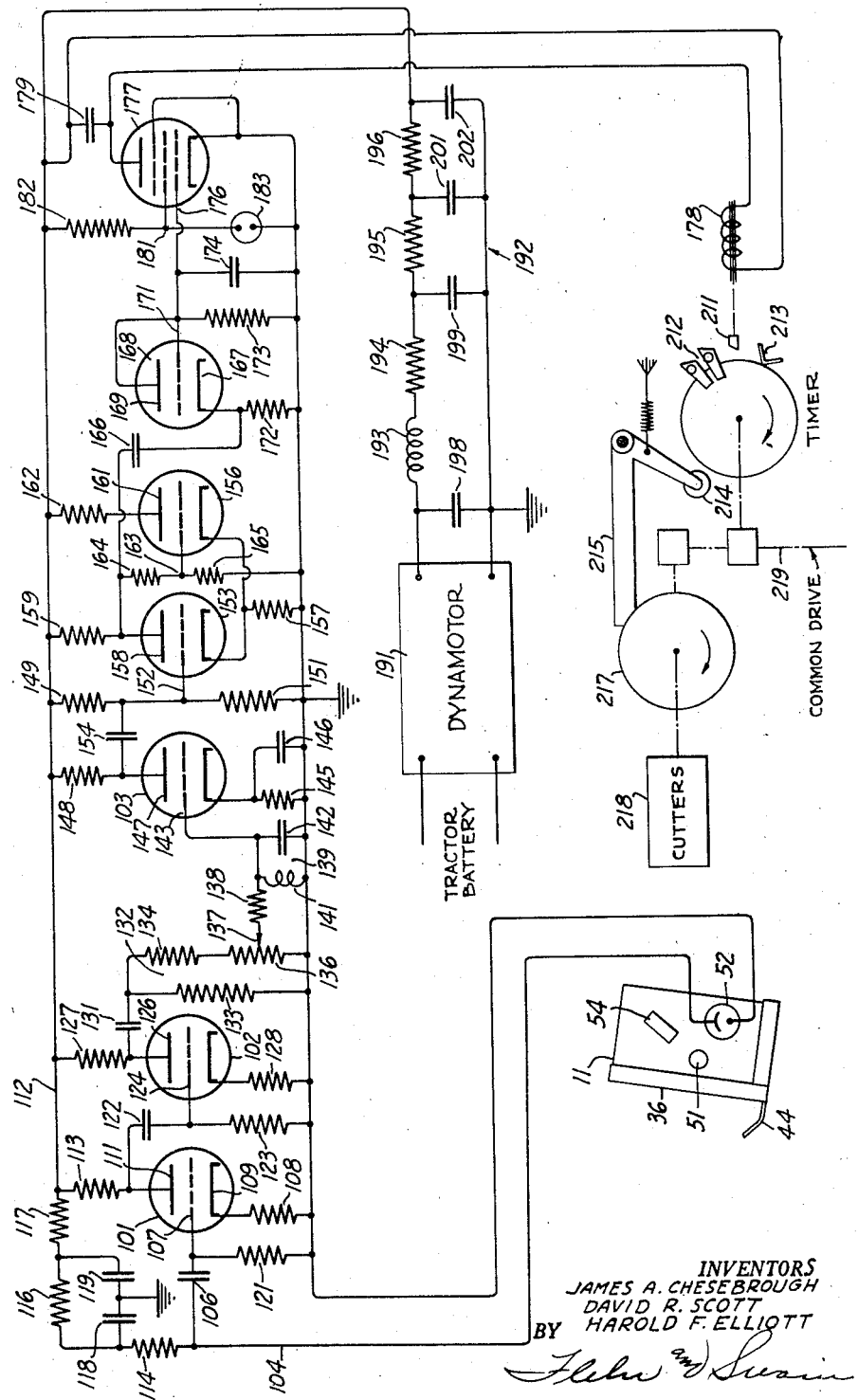

United States Patent Office 2,894,178
Patented July 7, 1959

2,894,178
PHOTOELECTRIC SYSTEM

James A. Chesebrough, Los Altos, David R. Scott, Palo Alto, and Harold F. Elliott, Menlo Park, Calif., assignors, by mesne assignments, to Hewlett-Packard Company, Palo Alto, Calif., a corporation of California Application January 18, 1956, Serial No. 559,936

5 Claims. (Cl. 317—130)

This invention relates generally to a photoelectric system and more particularly to a photoelectric system particularly adaptable for use in agricultural machines of the type disclosed in the co-pending application filed January 18, 1956, Serial Number 559,855, now Patent No. 2,864,292, and entitled "Agricultural Machine."

In the said co-pending application there is described an improved agricultural machine which is capable of selectively operating on a row of plants to perform various operations, such as thinning, weeding or cultivating. A tractor serves to carry generally horizontal shafts which are provided with ground engaging means. The ground engaging means are driven by driving means connected to a clutch which is controlled by photoelectric means. Photoelectric means are carried in advance of each ground engaging means and give an output signal in response to light responses from plants. An electronic circuit serves to control electromagnetic means which operate in conjunction with a timing device to actuate the clutch when responses are received from a plant in a desired condition of growth.

It is apparent that if the agricultural machine is to operate satisfactorily, the photoelectric unit must give a response only when responses are received from a desired plant. The unit must be relatively immune from dust, moisture, and reflection from extraneous objects. The electronic system should be capable of being set to respond to plants in a predetermined condition of growth. The output of the electronic circuit should be constant for desired plants.

It has been found that residual magnetism in the magnetic components of the electromagnetic means sometime causes faulty operation.

In general, it is an object of the present invention to provide a photoelectric system which is not subject to the above disadvantages, and which will effect reliable and relatively accurate operation of the ground engaging means.

It is another object of the present invention to provide a photoelectric unit which is relatively immune to interference from dust.

It is still another object of the present invention to provide an electronic system which gives a constant output in response to signals from plants in the desired condition of growth.

It is still a further object of the present invention to provide an electronic system in which adjustment can be made whereby the apparatus responds to plants in a predetermined condition of growth.

Another object of the invention is to provide a novel electronic system of general industrial application which is particularly adapted to control operation of one or more devices in accordance with light responses received by a photoelectric means.

These and other objects of the invention will appear more clearly from the following description taken in conjunction with the accompanying drawing.

Referring to the drawing:

Figure 1 shows the photoelectric unit and means for mounting the same;

Figure 2 is a front elevational view of the photoelectric unit with the cover removed;

Figure 3 is a partial sectional view taken along the line 3—3 of Figure 2;

Figure 4 is a partial sectional view showing a photoelectric unit which incorporates a photo-sensitive semiconductor; and Figure 5 is a diagram of the electrical circuit together with a schematic diagram of the associated operating parts of the agricultural machine.

The photoelectric means and a light source may be housed within a box 11 which is carried in advance of the cutters (not shown) of an agricultural machine which may be of the type described in said co-pending application. The box illustrated is mounted on means which enables vertical movement of the same. A U-shaped member 13 has its depending portions extending along the sides of the box. The ends 14 are suitably secured to the lower portion of the box 11. The slot 16 provides means for adjusting the angular position of the box with respect to the U-shaped member. The bolt 15 which is secured to the box may be loosened to adjust the angular position.

The links 17, 18 and 19 are suitably pivoted 21, 22 and 23, respectively to the U-shaped member 13. The link 19 is pivoted 26 to one end of the arm 27. The links 17 and 18 cross and are pivoted 28 and 29 to opposite ends of the arm 31. Similarly, links 17, 18 and 19 are disposed and pivoted to the other leg of the U-shaped member 13. On the opposite side a link is connected to an arm mounted on the same shaft as arm 31, while a pair of links are crossed and connected to an arm mounted on the same shaft as arm 27. The shafts are provided with a collar and a torsion spring. The torsion spring provides a force which urges the arms to rotate in a direction which counterbalances the weight of the box. The arrangement of the links and the arms is such that it permits vertical movement of the box but does not permit the box to move in a longitudinal direction as it is moved vertically. This is in contrast to well known parallel movements in which the angle between elements attached to the two ends are maintained constant, but in which the horizontal distances between the members varies as the members are moved vertically with respect to one another.

The box 11 has a detachable cover 36. A suitable rubber gasket 37 is placed between the box and cover whereby the box is sealed against dust. The cover is removably clamped into place by means of screws 38. A glass plate 39 is fitted over the lower open portion of the box 11. Suitable means such as a soft rubber gasket 41 is placed between the glass plates and the bottom wall of the box to form a seal. The glass plate 39 is removably clamped by the side straps 42 which are releasably attached to the side walls of the box, and which have lower inturned portions 43 which underlie the side edges of the plate 39. A runner 44 is attached to the forward lower surface of the box. The runner serves to deflect plants downward and forward whereby they pass underneath the box adjacent the window.

Mounted above the glass plate and within the box there is a light source 51 and a plurality of photoelectric means 52 disposed side by side and facing the window. The photoelectric means are chosen to have the proper spectral response. As is well known, the earth absorbs infra-red energy to a higher degree while the plants reflect infra-red energy. Thus in agricultural operations, it is desirable to operate in the near infra-red region of the spectrum. By appropriately choosing the photoelectric means to have a response in this region of the spectrum, or by employing suitable color filters, it is possible to discriminate between desired responses obtained from plants and those obtained from the ground.

The light source 51, may, for example, be an incandescent lamp. The light is focused by the lens 53 onto the rotating mirror holder 54. The rotating mirror holder is provided with a plurality of mirrors about its periphery. Thus, as the holder rotates, the spot of light projected by the lens is scanned across the window from one side of the box to the other. The mirrors are arranged whereby as one spot is leaving the window, a new spot is being projected thereon. As a result the surface of the window is continuously and constantly illuminated. Consequently, the photoelectric means operates satisfactorily even when the window or associated parts are covered with dust, as will be presently described.

In operating the device, the glass plate 39 passes over the plants and the foliage wipes across the lower surface. It is a function of the photoelectric means 52 to secure a light response from a plant which is being viewed through the window. The light response is preferably from a part of the plant which is indicative of the location of the central axis of the plant root. We have found that light responses are indicative of the central axis of the plant root if the indications are obtained from the bent over stem portions of the plant. By stem portions we have reference to the portions of the plant near the root, which in some plants may include some foliage, but which is to be distinguished from the main leafy portion of the plant which spreads out over a considerable area.

For accurate indication of plant location, we limit the area from which the light indication can be secured to a relatively narrow zone indicated by the numeral 56 which extends in a general lateral direction across the box 11. It is desirable that this zone be inclined with respect to the direction of movement of the device along the row of plants, and that the direction of the opening be generally parallel to the path taken by the cutter blades as they pass through the earth. This serves the purpose of enabling some misalignment of each of the photoelectric units with respect to the associated plant row without interfering with the accuracy with which the ground engaging means are brought into play to eradicate the plants or weeds from both sides of the selected plant.

As is well known, when the light strikes the glass plate 39, a certain amount of light is reflected from the upper and lower surfaces. By maintaining the surface of the plate continuously and constantly illuminated, any reflections from the upper surface of the glass plate which has collected dust or any reflections from the lower surface which has been glazed by contact with the earth, give rise to a D.-C. signal at the photoelectric means. This signal is not amplified by the A.-C. amplifier to be presently described, associated with the photoelectric means. Since recurrent spots of light traverse across the opening 56 at a rapid rate of speed, when a plant is located beneath the opening 56 a series of recurrent reflections are obtained from the plant, one for each spot which scans across the opening. These responses are picked up by the photoelectric means and applied to an amplifier which is tuned to the frequency of operation of the rotating mirror 54 and which serves to amplify the impulses and to operate a clutch, as will be presently described. The rotating mirrors 54 are driven by a suitable motor 57.

The photoelectric tubes 52 shown and described in conjunction with Figures 2 and 3 may be replaced by other suitable photoelectric means such as photo-sensitive semiconductor devices. Referring to Figure 4, a sectional view showing the lower portion of the unit 11 is shown. In this view, the photoelectric tubes 52 are replaced by the photo-sensitive semiconductor means 52a. The means 52a is disposed adjacent the opening 56 and serve to intercept light reflected from the plants which pass under the unit.

The terminals of the photoelectric means 52 are connected with amplifying means (Figure 5) which include the cascade amplifier comprising the vacuum tubes 101, 102 and 103. The photoelectric means are designated generally by the reference numeral 52. The conductor 104 is connected to one side of the photoelectric means 52 and to the capacitor 106 which couples said means to the grid 107 of the tube 101. The other side of the photoelectric means is grounded. The bias resistor 108 is connected between the cathode 109 and ground. The plate 111 is connected to the lead 112 through the resistor 113. Series resistors 114, 116 and 117 are connected between the lines 104 and 112. Series capacitors 118 and 119 are connected in shunt with the resistor 116 and their common junction is grounded. Grid leak resistor 121 is connected from the grid 107 to ground.

The first amplifier stage is suitably coupled to the second stage which includes the tube 102. The series combination of capacitor 122 and resistor 123 serve to couple the output of the tube 101 to the grid 124 of the tube 102. The plate 126 is connected to the lead 112 by the resistor 127. The bias resistor 128 serves to connect the cathode to ground.

The capacitor 131 couples the output of the tube 102 to the resistors designated generally by the numeral 132 and which comprises the resistor 133 connected in parallel with the series combination of resistors 134 and 136. The resistor 136 includes an adjustable tap 137 whereby a suitable voltage may be obtained from the voltage divider. As will be presently described, this tap serves to control the minimum sized plant whose reflection will operate associated equipment. The variable tap 137 is resistively connected 138 to the tuned circuit 139 which comprises the inductor 141 and the capacitor 142. The value of the inductor 141 and capacitor 142 is chosen whereby the tuned circuit is resonant at the frequency at which the recurrent light beams scan across the opening 56 which, as previously described, is dependent upon the speed of rotation of the mirror holder 54. Thus the signal which appears across the tank circuit is the A.-C. signal which is generated by the photoelectric means responsive to the light reflections from plants which pass under the unit 11. In one particular instance, the scanning frequency was approximately 1700 cycles per second. Thus, the tuned circuit was chosen to be resonant at this frequency. By increasing the speed of the motor or the number of mirrors, any desired scanning frequency may be obtained.

The voltage appearing across the tuned circuit 139 is applied to the grid 143 of the tube 103. A suitable biasing resistor 145 and by-pass capacitor 146 are connected between the cathode and ground. The plate 147 is resistively connected 148 to the line 112. The voltage divider network which comprises the series resistors 149 and 151 is connected between the line 112 and ground. The common junction of these resistors is connected to the grid 152 of the tube 153. The common junction is also capacitively coupled to the plate 147 by the capacitor 154.

Operation of the circuit thus far described is briefly as follows: The stages which include tubes 101 and 102 act as untuned amplifiers. The amplified voltage is applied to the tuned circuit which serves to discriminate against extraneous signals. The voltage across the tuned circuit is applied to the grid 143 of the amplifier tube 103 which further amplifies the signal and is then applied to the grid 152 of the tube 153 which forms a part of a trigger circuit.

A bistable or trigger circuit comprises the tubes 153 and 156 which have their cathodes connected together and to ground through the resistor 157. The plate 158 is connected to the lead 112 through the resistor 159. The plate 161 is connected to the lead 112 through the resistor 162. The grid 163 of the tube 156 is resistively connected to the plate 158 by the resistor 164. Resistor 165 resistively connects the grid 163 to ground. The plate is also capacitively 166 coupled to the cathode 167 of the tube 168. The tubes 153 and 156 and the circuitry form a trigger circuit of the type commonly referred to as a Schmidt trigger. As is well known, this type of circuit is a form of bi-stable circuit.

Operation of the bistable circuit is briefly as follows: The tube 156 is normally conducting and the tube 153 is normally nonconducting. When the voltage on the grid 152 reaches a predetermined positive value, the tube 153 begins to conduct thereby lowering its plate voltage. The pulse which results is applied to the cathode 167 of the tube 168 and to the grid 163 of the tube 156. This pulse serves to cut off the tube 156. Thus the circuit has been changed from one conductive state to another. The circuit remains in the new state until the voltage on its grid decreases to a predetermined value and then reverts to the original state wherein the tube 156 is again conducting and the tube 153 is non-conducting. The increasing positive voltage and the decreasing positive voltage differ by the hysteresis of the circuit.

The tube 168 has its plate 169 directly connected to the grid thereby forming a diode. The cathode 167 is connected to ground through the resistor 172. The grid 171 is connected to ground through the resistor 173. The by-pass capacitor 174 is connected in parallel with the resistor 173. The diode passes the negative pulse to the grid 176 of the tube 177. The tube 177 has its plate connected to the lead 112 through the parallel combination of the coil 178 of the electromagnetic means and capacitor 179. The grid 181 is connected to the common terminal of the resistor 182 and the neon bulb 183. The neon bulb and resistor are connected between lead 112 and ground.

The tube 177 is biased whereby it is normally conducting thereby keeping the coil 178 energized. When the bi-stable circuit is triggered, the pulse which is applied through the condenser 166 to the cathode 167 of the diode 168 serves to bias the tube 177 beyond cut-off. This de-energizes the coil 178 and permits the electromagnetic means to operate. When the tube 177 is cut off, the plate voltage instantaneously rises thereby charging the capacitor 179. The capacitor 179 then discharges through the coil 178. The direction of current flow through the coil is opposite to the normal direction thereby reversing the magnetization. This overcomes the residual magnetization and allows the relay to be released immediately because of repulsion between the residual magnetism in the armature and induced magnetism generated by the reverse current. The resistor 173 and the capacitor 174 are so chosen that the tube 177 remains non-conducting for a period of time which is sufficient for the electromagnetic means to operate.

Plate voltage is applied to the equipment from a suitable source. For example, when the equipment is operated in conjunction with agricultural equipment, the tractor battery is employed for supplying the power. Thus, the battery is connected to the dynamotor 191. The filter system which is designated generally by the numeral 192 serves to filter the output and apply a D.-C. voltage to the circuit. The filter system comprises a series combination of inductor 193 and resistors 194, 195 and 196 connected in series in the line 112. The capacitor 198 is connected across the output leads of the dynamotor. The capacitor 199 is connected between the common junction of the resistors 194 and 195 and ground. The capacitor 201 is connected between the common junction of resistors 195 and 196 and ground. The capacitor 202 is connected between the lead 112 and ground.

The over-all operation of the electronic system is as follows: The photoelectric means 52 receives the illumination reflected by the plant and generates a voltage. The voltage is amplified by the untuned cascade amplifier comprising the tubes 101 and 102. The output of the tube 102 is applied to the tuned circuit 139 at the variable tap 137. By adjustment of the position of the tap 137, an adjustment for plant size may be made. The signal appearing across the tuned circuit is amplified by the tube 103 and then supplied to the bistable circuit. The circuit is triggered when the amplified signal has a predetermined amplitude. When the circuit is triggered, a pulse is applied to the diode and is conducted to cut off the tube 177. The coil 178 is de-energized to actuate the associated equipment.

In one particular instance, apparatus was constructed for operation at the frequency previously mentioned, namely, 1700 cycles per second, and the various resistors, condensers, inductors and tubes had values as follows: The photo tubes 52 were of the type known by manufacturer's specification as 922, tube 101 was of the type known by manufacturer's specification as 12AY7, tube 102 was of the type known by manufacturer's specification as 12AY7, tube 103 was of the type known by manufacturer's specification as 12AU7, tube 153 was of the type known by manufacturer's specification as 12AU7, tube 156 was of the type known by manufacturer's specification as 12AU7, tube 168 was of the type known by manufacturer's specification as 12AU7, tube 177 was of the type known by manufacturer's specification as 6CL6; capacitor 106, .005 mfd.; resistor 108, 1.8 k.; resistor 113, 180 k.; resistor 114, 3 megohms; resistor 116, 2.2 meg.; resistor 117, 2.2 meg.; capacitor 119, .5 mfd.; capacitor 118, .5 mfd.; resistor 121, 3 meg.; resistor 123, 1 meg.; capacitor 122, .005 mfd.; resistor 128, 4.7 k.; resistor 127, 180 k.; capacitor 131, .01 mfd.; resistor 133, 400 k.; resistor 134, 1.2 meg.; resistor 132, 2 meg.; induuctor 141, 6 henry; capacitor 142, 2000 µµf.; resistor 145, 2 k.; capacitor 146, .8 mfd.; resistor 148, 180 k.; resistor 149, 3.3 meg.; resistor 151, 820 k.; capacitor 154, .01 mfd.; resistor 157, 120 k.; resistor 159, 12 k.; resistor 162, 120 k.; resistor 164, 120 k.; capacitor 166, .01 mfd.; resistor 172, 1 meg.; resistor 173, 3 meg.; capacitor 174, .01 mfd.; capacitor 179, .01 mfd.; resistor 182, 47 k.; capacitor 198, .003 mfd.; inductor 193, 16 mil hen.; resistor 194, 1 k.; capacitors 199, 201 and 202, 20 mfd. each; resistors 195 and 196, 470 k. each.

It is apparent that the electronic system may be used in industrial application where it is desired to control one or more devices in response to responses from photoelectric means.

Operation of the photoelectric system with agricultural machines of the type described in said co-pending application may best be understood with reference to the diagrametric sketch shown in Figure 5 in conjunction with the circuit diagram as follows: The machine is operated in a field where plants are arranged in parallel rows, and the ground engaging means are arranged to operate upon the row of plants. The photoelectric unit 11 is mounted in advance of the cutters and arranged to pass over the plants. The angle that the opening 56 makes with the row of plants corresponds to the angle which the cutting means make as they engage the ground.

The light from the source 51 is focused on the revolving mirror 54 which then directs it downward to scan across the opening 56. The light reflected by the window, plant, etc. is picked up by the photoelectric means which develops an output voltage. The output voltage which comprises a D.-C. and an A.-C. component is applied to the A.-C. amplifier which is tuned to a frequency at which the recurrent light spot scans across the window. Assuming that a plant having a predetermined size passes the window 56, the amplifier will trigger the bistable circuit which in turn serves to cut off the tube 177 to de-energize the coil 178. The coil releases the associated armature which moves the stop 211 to release one of the cams 212. The cam travels past the reset lever 213 which resets the timing apparatus and then travels beneath the roller 214 which serves to actuate the arm 215 to release the associated clutch 217. The clutch 217 serves to drive the ground engaging means 218 which eradicate undesired plants or weeds. As a result, when a desired plant is sighted through the window, the cutter means are actuated to eradicate all other plants along a row and leave the desired plant standing. The ground travel between the formation of the voltage by the photoelectric means 52 and the actuation of the cutting means 218 is such that the cutting means have time to travel forward to the plant which was previously sighted. The reset means serves to render the timing device inoperative for a predetermined distance of travel whereby the minimum spacing between the plants in the desired condition of growth may be controlled. It is, of course, apparent that the photoelectric means and agricultural means may perform operations other than thinning as described. For example, the machine may be used to weed, to spray insecticides, and to cultivate.

Thus it is seen that we have provided a photoelectric system which is particularly adapted for use in agricultural machines of the type described in said co-pending application. The photoelectric system described is not subject to error due to dust collecting on the window 56 or to wear of the window as it scrapes along the ground. Because of the manner in which the light scans to maintain constant illumination on the window, the reflection due to dust or glazing of the glass plate give rise to a D.-C. signal in the photoelectric means. The A.-C. signal which is a result of light reflected from stems of plants in the desired condition of growth is applied to a tuned amplifier. The tuned amplifier includes means whereby an adjustment may be made for plant size. A constant output is obtained when a plant is in a predetermined condition of growth by employing the amplifiers in conjunction with the bi-stable circuit. This circuit gives a pulse of constant magnitude in response to light responses from plants in the desired condition of growth.

Further, means are provided whereby a reverse current is supplied through the coil 178 whereby the effects of residual magnetism in the electromagnetic means is eliminated. This prevents sticking of the electromagnetic means and therefore makes possible accurate, assured operation of the machine in response to a light response from a plant.

We claim:

1. In a photoelectric system for effecting operation in response to light responses from plants, a box-like enclosure having a window of light transparent material in one wall of the same, means to move said enclosure along a row of plants, a source of light carried by said enclosure, rotating means serving to carry a plurality of reflecting surfaces adapted to receive and reflect said light whereby it is successively scanned across the window at a predetermined rate, said reflecting surfaces being so arranged that as the light is leaving one side of the window it is entering the other whereby the window is continuously illuminated by a constant amount of light, photoelectric means carried by said enclosure and serving to form pulses in response to light reflected by said plants, electronic means connected to said photoelectric means and forming an output signal responsive to the pulses having the scanning frequency, and electromagnetic means connected to receive the output of said electronic means and serving to effect said operation.

2. Apparatus as in claim 1 wherein said electronic means includes adjustable means serving to limit the formation of an output signal to light reflected from plants in a predetermined condition of growth.

3. Apparatus as in claim 1 wherein said electronic means includes amplifying means serving to amplify said pulses, bistable means adapted to be triggered by pulses having a predetermined amplitude and serving to generate pulses of constant amplitude, and means adapted to receive said pulses and serving to form output signals which effect the operation.

4. In a photoelectric unit adapted to be moved along a row of plants and secure light responses from plants, a box-like enclosure having a window of light transparent material in one wall of the same, a light source disposed within the enclosure, rotating means serving to carry a plurality of reflecting surfaces also disposed within the enclosure, lens means interposed between said rotating means and said light source and serving to project a light beam on said reflecting surfaces, said reflecting surfaces serving to successively scan said light beam across the window to illuminate plants exterior of said enclosure, said reflecting surfaces being so arranged that the light beam is leaving one side of the window as it enters the other whereby the window is continuously illuminated by a constant amount of light, the light reflected by said plants being transmitted back through said window, photoelectric means disposed within said enclosure and arranged to receive the light reflected by said plants and serving to form output pulses in response thereto.

5. In a photoelectric system for effecting operation in response to light responses, a box-like enclosure having a window of light transparent material in one wall, a source of light carried by said unit, rotating means serving to carry a plurality of reflecting surfaces adapted to receive and reflect said light whereby it is successively scanned across the window at a predetermined rate, said reflecting surfaces being so arranged that as the light is leaving one side of the window it is entering the other whereby the window is continuously illuminated by a constant amount of light, photoelectric means carried by said unit and serving to form pulses in response to reflected light, electronic means connected to said photoelectric means and forming an output signal responsive to the pulses having the scanning frequency, and electromagnetic means connected to receive the output of said electronic means and serving to effect said operation.

References Cited in the file of this patent

UNITED STATES PATENTS

| | | |
|---|---|---|
| 2,514,405 | Marihart | July 11, 1950 |
| 2,596,591 | Packard | May 13, 1952 |
| 2,666,356 | Graham | Jan. 19, 1954 |
| 2,669,635 | Pfann | Feb. 16, 1954 |
| 2,682,132 | Marihart | June 29, 1954 |